United States Patent
Lee et al.

(10) Patent No.: US 11,048,485 B2
(45) Date of Patent: Jun. 29, 2021

(54) USER INTERFACE CODE RE-USE BASED UPON MACHINE LEARNING OF DESIGN DOCUMENTS

(71) Applicant: International Business Machines Corporation, Armonk, NY (US)

(72) Inventors: Kyungmin Lee, White Plains, NY (US); Stephen Wood, Thornwood, NY (US); Marco Pistoia, Amawalk, NY (US); Joseph Ligman, Wilton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 16/213,773

(22) Filed: Dec. 7, 2018

(65) Prior Publication Data
US 2020/0183664 A1    Jun. 11, 2020

(51) Int. Cl.
*G06F 8/38* (2018.01)
*G06F 8/10* (2018.01)
*G06F 8/41* (2018.01)

(52) U.S. Cl.
CPC .............. *G06F 8/38* (2013.01); *G06F 8/10* (2013.01); *G06F 8/433* (2013.01)

(58) Field of Classification Search
CPC ............... G06F 8/38; G06F 8/433; G06F 8/10
See application file for complete search history.

(56) References Cited

U.S. PATENT DOCUMENTS

| | | | |
|---|---|---|---|
| 5,872,973 A | 2/1999 | Mitchell et al. | |
| 6,862,735 B1 * | 3/2005 | Slaughter | G06F 9/541 719/315 |
| 7,219,305 B2 * | 5/2007 | Jennings | G06F 8/38 715/761 |
| 9,531,600 B2 | 12/2016 | Ligman et al. | |
| 9,600,246 B2 | 3/2017 | Ramanathan | |

(Continued)

FOREIGN PATENT DOCUMENTS

WO    2009061146 A2    5/2009

OTHER PUBLICATIONS

Shioji et al., "Code Shredding: Byte-Granular Randomization of Program Layout for Detecting Code-Reuse Attacks", Dec. 2012, ACM (Year: 2012).*

(Continued)

*Primary Examiner* — Wei Y Zhen
*Assistant Examiner* — Junchun Wu
(74) *Attorney, Agent, or Firm* — Garg Law Firm, PLLC; Rakesh Garg; Anthony Curro

(57) ABSTRACT

Facilitating code re-use includes receiving a first design document. The first user design document specifies a graphical layout of a first set of user interface elements of a user interface of a first application. First source code associated with the design document is received. The first source code is configured to implement the first set of user interface elements of the user interface. A processor extracts the first set of user interface elements from the first user interface design document. A first portion of the first source code corresponding to a first user interface element of the first set of user interface elements is identified. The first portion of the first source code is encapsulated into a module to enable re-use of the portion of the source code in a second application.

18 Claims, 5 Drawing Sheets

(56) References Cited

U.S. PATENT DOCUMENTS

| | | | |
|---|---|---|---|
| 2003/0025732 A1* | 2/2003 | Prichard | G06F 8/38 715/765 |
| 2003/0172367 A1* | 9/2003 | Kannenberg | G06F 8/71 717/101 |
| 2005/0144226 A1 | 6/2005 | Purewal | |
| 2006/0101442 A1* | 5/2006 | Baumgart | G06F 8/38 717/162 |
| 2008/0189684 A1* | 8/2008 | Sareday | G06F 9/451 717/120 |
| 2008/0222618 A1* | 9/2008 | Valtchev | G06F 3/0482 717/139 |
| 2012/0173567 A1* | 7/2012 | Zavatone | G06F 16/907 707/769 |
| 2012/0174000 A1* | 7/2012 | Zavatone | G06F 8/38 715/763 |
| 2013/0111329 A1* | 5/2013 | Jaganathan | G06F 8/38 715/239 |
| 2014/0109106 A1* | 4/2014 | Fanning | G06F 8/433 718/106 |
| 2016/0054985 A1* | 2/2016 | Cragun | G06F 11/36 715/762 |
| 2016/0124744 A1* | 5/2016 | Kruglick | G06F 8/65 717/121 |
| 2016/0239162 A1* | 8/2016 | Sivasubramanian | G06F 3/0482 |
| 2016/0364449 A1* | 12/2016 | Kozhaya | G06F 16/285 |
| 2017/0118094 A1* | 4/2017 | Rao | G06Q 10/0631 |
| 2017/0192797 A1* | 7/2017 | Snir | G06F 9/44 |
| 2017/0213131 A1* | 7/2017 | Hammond | H04L 67/42 |
| 2019/0196793 A1* | 6/2019 | Jaiprakash | G06F 8/34 |
| 2019/0251182 A1* | 8/2019 | Ray | G06F 40/194 |
| 2020/0081691 A1* | 3/2020 | Gupta | G06N 3/082 |

OTHER PUBLICATIONS

Crestani et al., "Design of a Graphical User Interface for Focussed Retrieval of Structured Documents", 2001, IEEE (Year: 2001).*

Silva et al., "Generating user interface code in a model based user interface development environment", 2000, ACM (Year: 2000).*

Lin et al., "Mining Implicit Design Templates for Actionable Code Reuse", 2017, IEEE (Year: 2017).*

Matulic et al., "Demo Abstract: SmartPublisher—Document Creation on Pen-Based Systems Via Document Element Reuse", Oct. 2006, ACM (Year: 2006).*

Zeidler et al., "The Auckland Layout Editor: An Improved GUI Layout Specification Process", Oct. 2013, ACM (Year: 2013).*

Kris Luyten, and Karin Coninx, "Uiml. net: an open uiml renderer for the. net framework," in Computer-Aided Design of User Interfaces IV, pp. 259-270. Springer, Dordrecht, 2005.

Tomas Cerny, Vaclav Chalupa, and Michael J. Donahoo, "Towards smart user interface design," in Information Science and Applications (ICISA), 2012 International Conference on, pp. 1-6. IEEE, 2012.

Tomas Cerny, Miroslav Macik, Michael J. Donahoo, and Jan Janousek, "On distributed concern delivery in user interface design," Computer Science and Information Systems 12, No. 2 (2015): 655-681.

* cited by examiner

USER INTERFACE CODE RE-USE BASED UPON MACHINE LEARNING OF DESIGN DOCUMENTS

TECHNICAL FIELD

The present invention relates generally to a method, system, and computer program product for user interface code re-use. More particularly, the present invention relates to a method, system, and computer program product for user interface code re-use based upon machine learning of design documents.

BACKGROUND

User interface (UI) design is the design of user interfaces for software applications for computers, mobile devices, and other electronic devices. User interface design focuses on maximizing usability and the user experience for a user interacting with the electronic device. A graphical user interface (GUI) is a form of user interface that allows user to interact with an electronic device through graphical icons and other visual indicators instead of text-based user interfaces. The actions in a GUI are typically performed through direct manipulation of graphical elements. Typically, users interact with information by manipulating visual widgets. A widget is an element of interaction of a GUI, such as a button or a scroll bar, that a user manipulates to perform an action associated with a software application. Software developers often use an integrated development environment (IDE) to code UIs for applications. An IDE is a software application that provides facilities to software developers for software development such as a source code editor, build automation tools, a debugger, and various tools to simplify the construction of a GUI.

SUMMARY

The illustrative embodiments provide a method, system, and computer program product. An embodiment of a computer-implemented method comprising includes receiving a first design document. In the embodiment, the first design document specifies a graphical layout of a first set of user interface elements of a user interface of a first application. The embodiment further includes receiving first source code associated with the design document. In the embodiment, the first source code is configured to implement the first set of user interface elements of the user interface. The embodiment further includes extracting, by a processor, the first set of user interface elements from the first user interface design document. The embodiment further includes identifying a first portion of the first source code corresponding to a first user interface element of the first set of user interface elements. The embodiment further includes encapsulating the first portion of the first source code into a module to enable re-use of the portion of the source code in a second application.

Another embodiment further includes determining one or more code dependencies for the first identified portion of the first source code, the one or more code dependencies including resources required by the first identified portion. Another embodiment further includes encapsulating the one or more code dependencies in the module.

Another embodiment further includes storing the encapsulated portion of the first source code in association with the first user interface element.

Another embodiment further includes receiving a second user interface design document. In the embodiment, the second user interface design document specifies a graphical layout of a second set of user interface elements of a user interface of the second application. The embodiment further includes extracting a second set of user interface elements from the second user interface design document, and matching a second extracted user interface element of the second set of user interface elements to the extracted first user interface element. The embodiment further includes retrieving the encapsulated first portion of the first source code associated with the first extracted user interface element, and outputting the encapsulated first portion of the first source code for re-use by the second application.

In another embodiment, matching the second extracted user interface element to the first extracted user interface element include determining that the second extracted user interface element matches the first extracted user interface element within a predetermined threshold range. In another embodiment, the matching of the second extracted user interface element to the first extracted user interface element is performed using computer vision processing.

In another embodiment, the first set of user interface elements are extracted from the first design document using cognitive machine learning. In another embodiment, the cognitive machine learning includes at least one of natural language processing or computer vision processing.

In another embodiment, the first extracted user interface element includes a widget.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
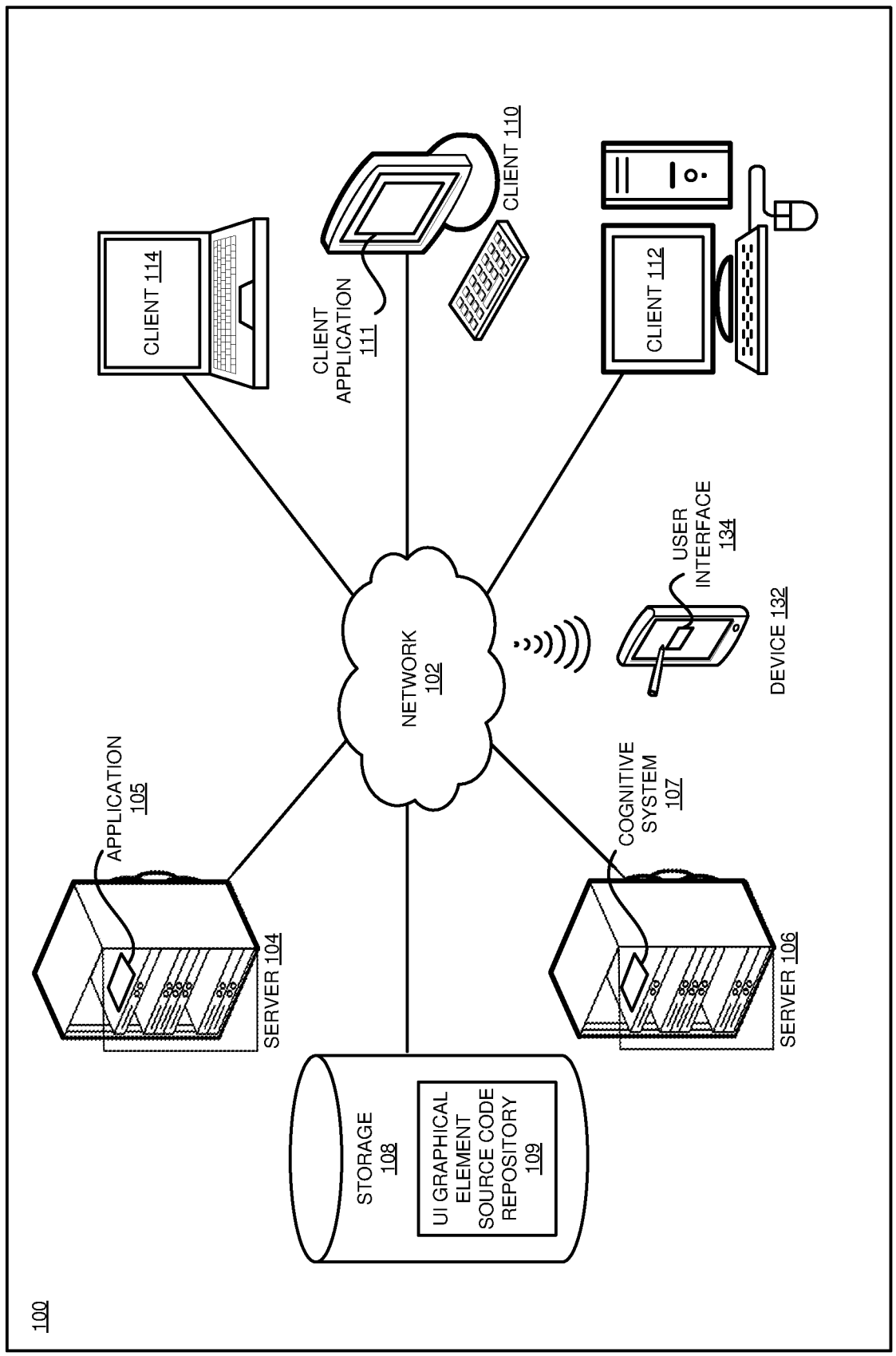
FIG. 1 depicts a block diagram of a network of data processing systems in which illustrative embodiments may be implemented.

The illustrative embodiments described herein are directed to user interface code re-use based upon machine learning of design documents. Embodiments recognize that in a typical mobile application development process, a team of designers who focus on usability, task, and workflow of an application generate a final design file that illustrates the set of screens and the functionality that the developers are required to implement. Developers identify specific user interface (UI) components in each design screen and write code to create the same components in new applications. For example, developers may recognize a Map UI element in a design file, and write code in a programming language to implement the Map UI element again. Embodiments recognize that this procedure is often a menial process, yet requires a large amount of the developers' time and effort. If the developers are not familiar with certain UI elements used in the design, even greater time may be required for the developers to implement the UI elements.

To assist developers and expedite the process of converting design into code, visual drag/drop tools have been developed to provide a more efficient application development process. The drag/drop tools typically provide a palette of UI controls (often extensible by plugin) that can be dragged/dropped to form a UI whereby predefined code fragments for creating the controls and skeletons for responding to control interaction are added to the application. Using such tools, a developer does not have to individually code the location, margin, and content of the UI elements. However, embodiments recognize that significant limits to the current approaches for UI implementation exist. For example, if a developer is not familiar with a particular UI element, the developer may have look up the name of the UI element using other sources such as using a search engine. Further, these visual drag/drop tools only provide empty generic skeleton framework code and do not provide code for logic corresponding to each UI element (e.g., what happens after clicking a button).

Various embodiments described herein provide for a system that receives an application UI design file as an input as well as each individual design screen in the UI design file. In one or more embodiments, the system generates code that captures the UI elements represented in a design screen. In one or more embodiments, the system performs machine learning using past design files and corresponding source codes to generate the code corresponding to the input UI design file. In one or more embodiments, a visual search engine is used to match a target design with prior designs and automatically provide the necessary UI and source code corresponding to the design by extracting the logic the visual search engine deems relevant from the complete original application source in which the prior design was coded.

Rather than empty generic skeleton framework code, which is typical of existing visual drag/drop tools, one or more embodiments provide for supplying more complete working code mined from past working applications. As more applications are developed and added, more designs/functions and their corresponding codes are learned and automatically be made available for re-use.

In an embodiment, the system receives completed UI design files and source code for one or more applications, such a mobile applications, in a training stage. For each mobile application, the system extracts the UI elements present in the design file and finds the corresponding source codes for each UI element using a cognitive machine learning process. In some circumstances, a clear linkage may not exist to match UI elements of the design file to the corresponding source code of the UI element. For instance, if a UI design file contains a screen with a Help button, the system may find a clear linkage to the source code by finding the code implementing the action triggered by the application whenever the Help button is pressed. However, some UI elements may not have this clear linkage, e.g., a button may have been implemented using custom images. In such cases, the system may use visual recognition, natural language processing (NLP) or a matching machine learning algorithm to identify the linkage between the UI element in the UI design file and the corresponding source code.

In the embodiment, after the system maps an individual UI element to the corresponding source, the system learns the codes that a developer used to implement a function corresponding to the UI element. In a particular embodiment, the system utilizes a customized natural language processing engine that is designed to understand both programming languages and human languages. With this type of cognitive learning, the system learns what codes that are needed to implement a specific UI element. For instance, to implement a button, the system discovers that a button name associated with the button is needed and the action that needs to be performed after the button is clicked. In the set of source code, the system recognizes that the button calls a specific function (e.g., loading a different screen). In the embodiment, the system identifies an entry point for a specific UI element and uses static program analysis to compute the code that needs to be imported in order to have a full implementation of the action performed by the application once the user interacts with that UI element. In the embodiment, the computed code is made available to the developer for integration within a new application.

An embodiment can be implemented as a software application. The application implementing an embodiment can be configured as a modification of an existing user interface development environment or platform, as a separate application that operates in conjunction with an existing interface development environment or platform, a standalone application, or some combination thereof.

The illustrative embodiments are described with respect to certain types of development tools and platforms, procedures and algorithms, services, devices, data processing systems, environments, components, graphical elements, graphical features, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
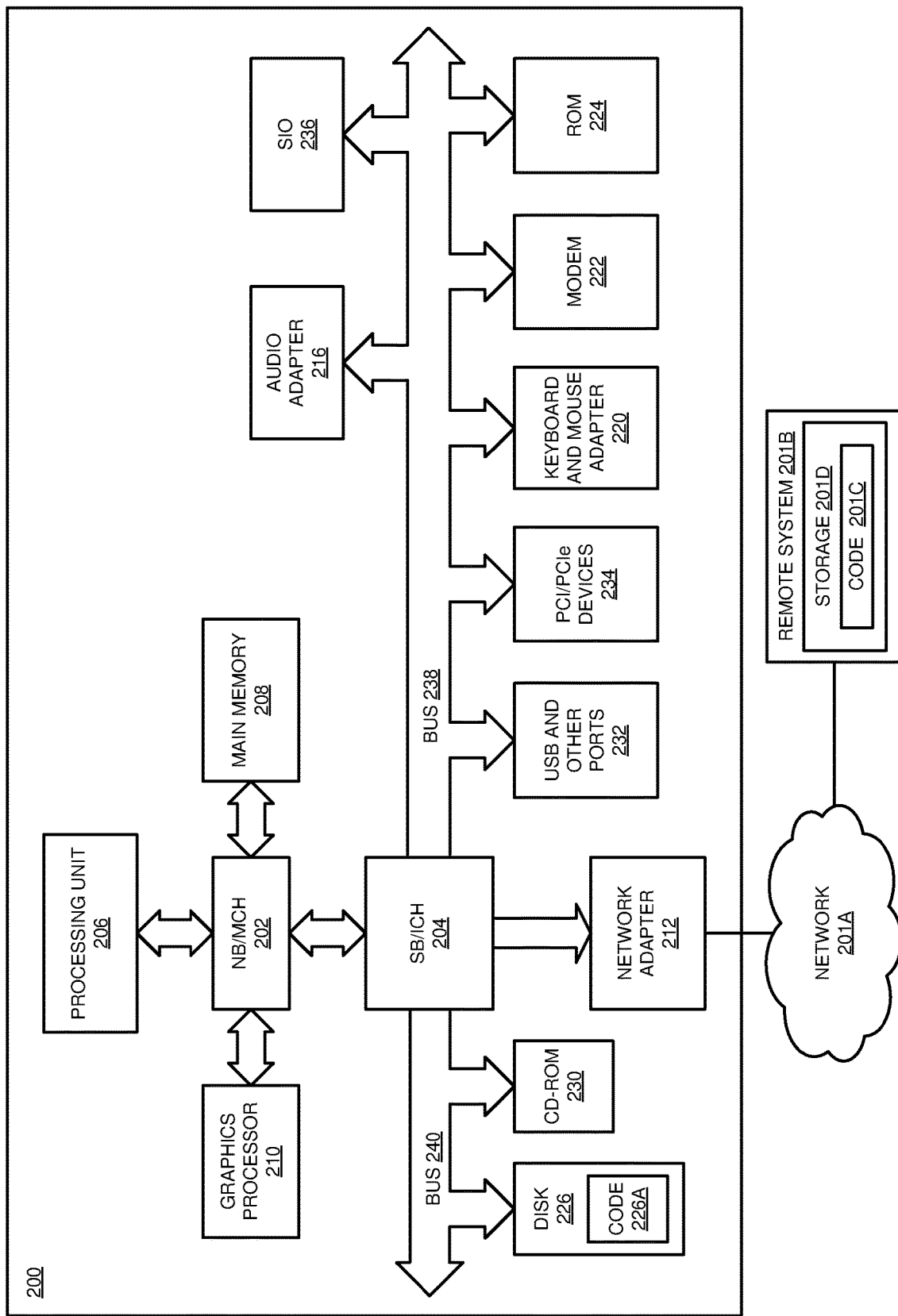
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage device 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon. Client 110 includes a client application 111 providing a user interface to allow a designer to develop one or more applications from received source code associated with one or more UI graphical elements as described with respect to one or more embodiments.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Device 132 includes a user interface 134 within a display of device 132 in which user interface 134 is implemented by computer code generated from a UI design document specifying a GUI as described herein with respect to one or more embodiments. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage device 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Server 104 includes an application 105 that may be configured to implement one or more of the functions described herein for user interface code re-use based upon machine learning of design documents in accordance with one or more embodiments.

Server 106 includes a cognitive system 107 configured to identify code corresponding to a UI graphical element extracted from a UI design file as described herein with respect to various embodiments. Storage device 108 includes a UI graphical element source code repository 109 configured to store the source code corresponding to one or more UI graphical elements as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system.

Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 or server 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
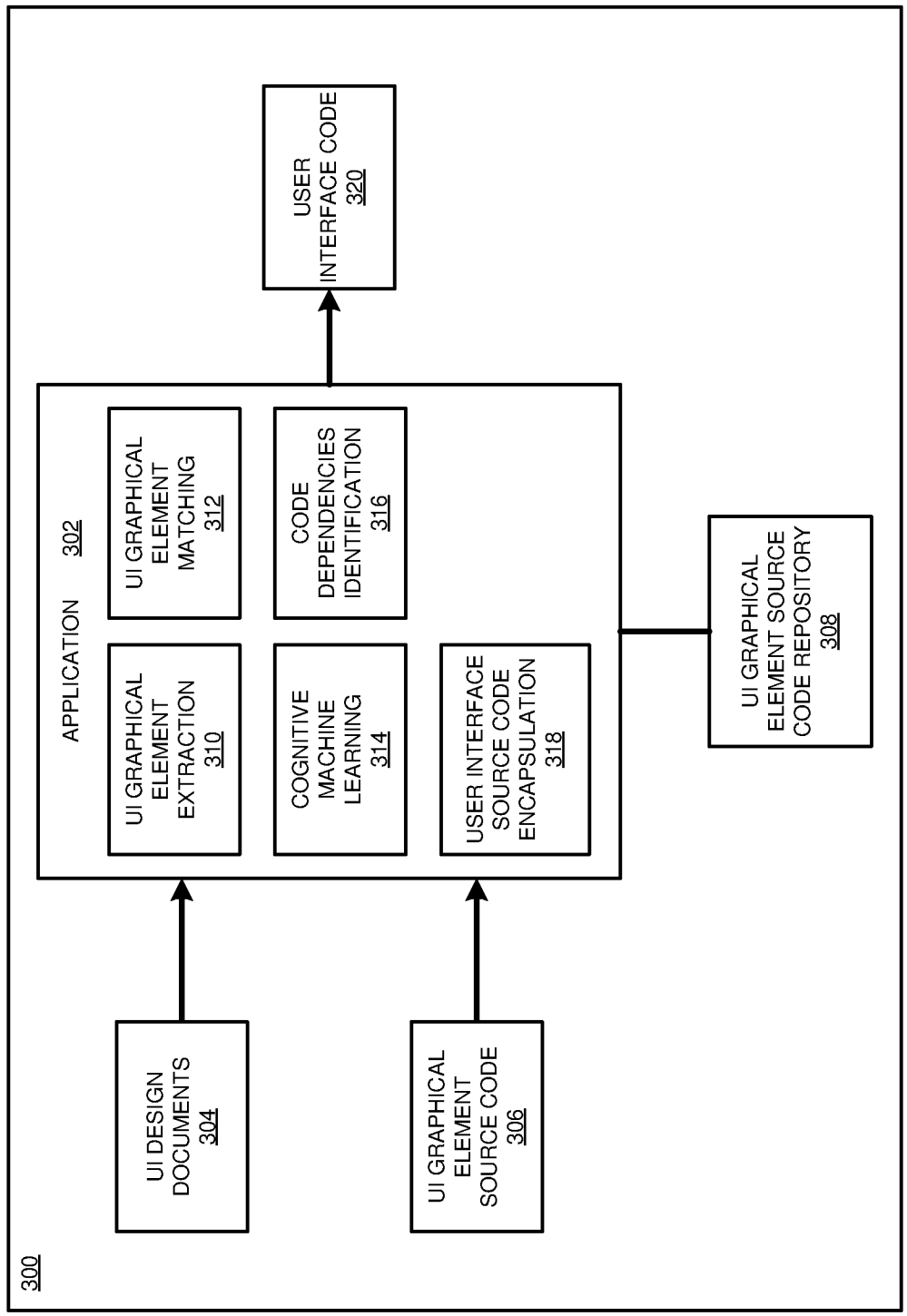
FIG. 3, depicts a block diagram of an example configuration for user interface code re-use based upon machine learning of design documents in accordance with an illustrative embodiment.

With reference to FIG. 3, this figure depicts a block diagram of an example configuration 300 for user interface code re-use based upon machine learning of design documents in accordance with an illustrative embodiment. The example embodiment includes an application 302. In a particular embodiment, application 302 is an example of application 105 of FIG. 1.

Application 302 receives one or more UI design documents 304 in which each document includes a specification of a graphical layout of a user interface including one or more user interface graphical elements for an application. In one or more embodiments, the user interface graphical elements include user interface elements (e.g., widgets) and/or one or more graphical element properties (e.g., a color or a font size). Application 302 further receives UI graphical element source code 306 including source configured to implement one or more graphical UI elements illustrated or described in UI design documents 304.

Application 308 is in communication with a UI graphical element source code repository 308 configured to store source code and related code dependencies associated with UI graphical elements extracted from previous design documents. In a particular embodiment, UI graphical element source code repository 308 is an example of UI graphical element source code repository 109 of FIG. 1.

Application 302 includes a UI graphical element extraction component 310, a UI graphical element matching component 312, a cognitive machine learning component 314, a code dependencies identification component 316 and a user interface source code encapsulation component 318. In the embodiment, UI graphical element extraction component 310 is configured to extract one or more UI graphical elements from one or more UI design documents 304.

UI graphical element matching component 312 is configured to match one or more UI graphical elements extracted from a UI design document with one or more candidate UI graphical elements from UI graphical element source code repository 308 and select the matching one or more matching candidate UI graphical elements corresponding to the extracted UI graphical elements.

Cognitive machine learning component 314 is configured to identify a portion of source code corresponding to the candidate UI graphical elements using one or more machine learning processes such as one or more of visual recognition, NLP or another matching machine learning algorithm to identify a linkage between the UI graphical element in the UI design file and the corresponding source code. In a particular embodiment, the system utilizes a NLP engine that is designed to understand both programming languages and human languages to identify a linkage between a UI graphical element and corresponding source code.

Code dependencies identification component 316 is configured to determine code dependencies for the identified portion of the source code in which the code dependencies include code, libraries, or other resources required by the identified portion to provide the functionality of the identified portion. UI source code encapsulation component 318 is configured to encapsulate the portion of source code and the code dependencies and provide the encapsulated source code and code dependencies as user interface code 320. In particular embodiments, the source code and the code dependencies are incorporated into a source code module. In one or more embodiments, a developer incorporates user interface code 320 into a software application to implement one or more user interface elements specified or illustrated by a UI design document. In a particular embodiment, user interface code includes computer code configured to execute within an application of device 132 of FIG. 1 to implement one or more graphical UI elements within user interface 134.

Figure 4:
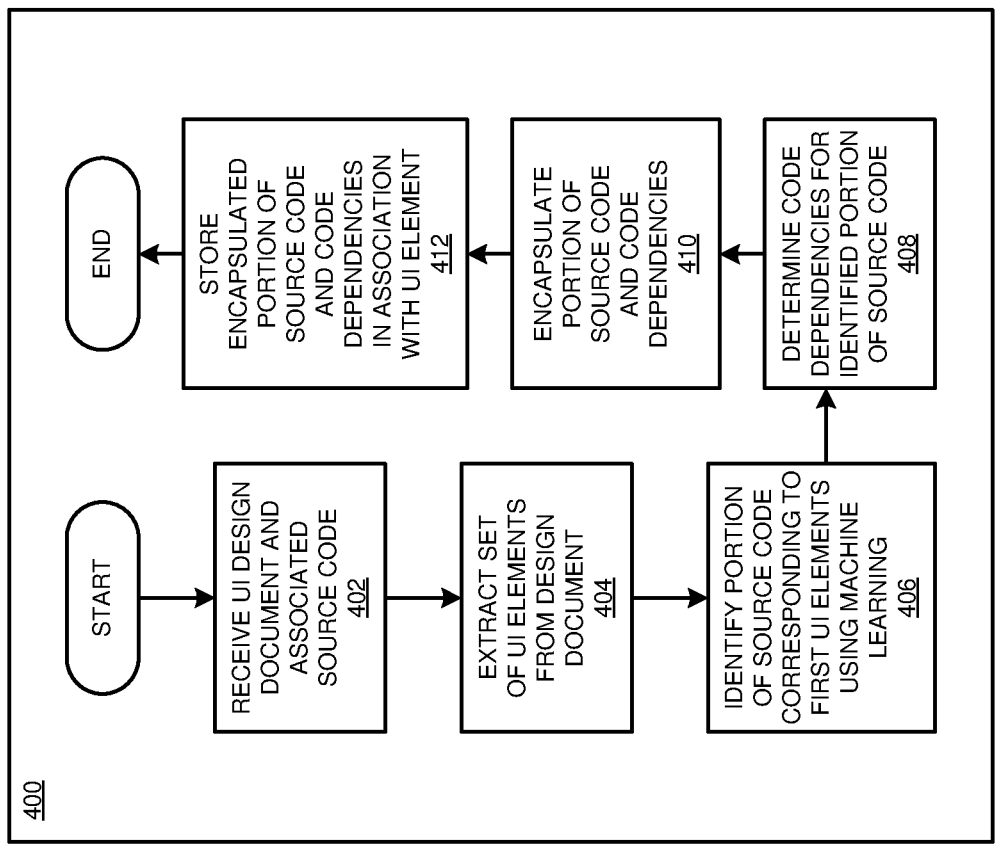
FIG. 4 depicts a flowchart of an example training process for user interface code re-use based upon machine learning of design documents in accordance with an illustrative embodiment.

With reference to FIG. 4, this figure depicts a flowchart of an example training process 400 for user interface code re-use based upon machine learning of design documents in accordance with an illustrative embodiment. In block 402, application 105 receives a UI design document specifying and/or illustrating a graphical layout of graphical UI elements of a user interface for a screen or an application and associated source code. In one or more embodiments, the UI design document specifies UI elements of a previously developed user interface and the associated source code includes source code developed to implement the UI elements.

In block 404, application 105 extracts a set of UI elements from the UI design document. In a particular embodiment, a UI element feature includes a UI graphical element such as a widget. In another particular embodiment, a UI graphical feature includes a graphical element property associated with a graphical element specified in the presentation document such as a color of the UI graphical element, a font type of the UI graphical element, or a font size of the UI graphical element.

In block 406, application 105 identifies a portion of source code corresponding to a first UI element from the set of UI elements using cognitive machine learning such as one or more of natural language processing (NLP) or visual recognition. In block 408, application 105 determines code dependencies for the identified portion of source code. In particular embodiments, code dependencies include source code, libraries, or other resources required by the identified portion to provide the UI functionality of the identified portion.

In block 410, application 105 encapsulates the portion of source code and the code dependencies into a UI interface source code module. In block 412, application 105 stores the encapsulated portion of source code and code dependencies in associated with the extracted first UI element. In one or more embodiments, the encapsulated portion of source code and code dependencies are stored in a repository such as UI graphical element source code repository 109 of FIG. 1. In one or more embodiments, blocks 404-412 are repeated for one or more UI elements in the same design document and/or for multiple UI design documents associated with a plurality of previously developed applications. Procedure 400 then ends.

Figure 5:
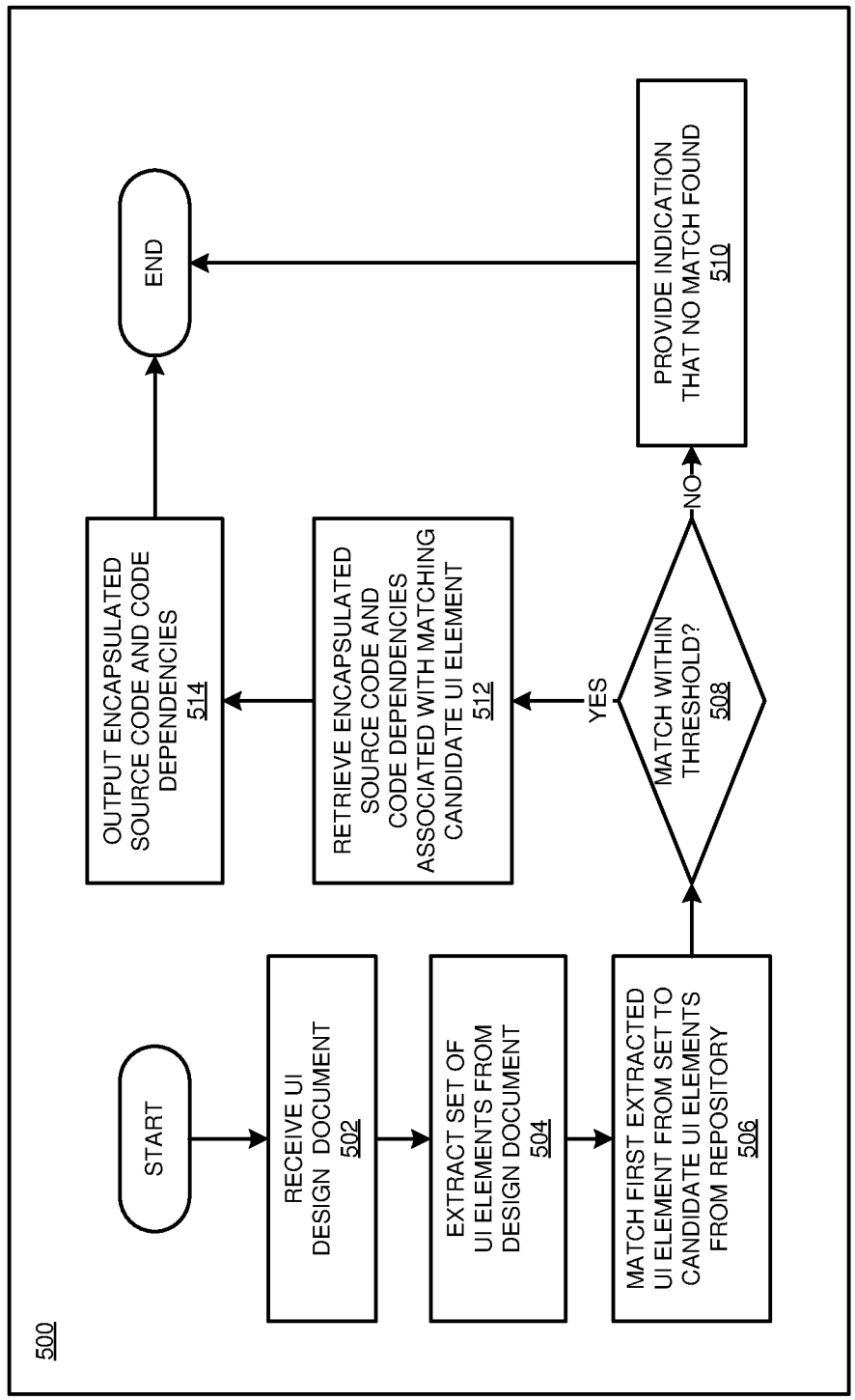
FIG. 5 depicts a flowchart of an example process for user interface code re-use based upon machine learning of design documents in accordance with an illustrative embodiment.

With reference to FIG. 5, this figure depicts a flowchart of an example process 500 for user interface code re-use based upon machine learning of design documents in accordance with an illustrative embodiment. In block 502, application 105 receives a UI design document specifying and/or illustrating a graphical layout of one or more graphical UI elements of a user interface for a new application to be developed.

In block 504, application 105 extracts a set of UI elements from the UI design document. In block 506, application 105 matches a first extracted UI element to one or more candidate UI elements in a repository such as such as UI graphical element source code repository 109 of FIG. 1. In particular embodiments, each candidate UI element in the repository is associated with source code to implement the UI element in a GUI. In a particular embodiment, the system determines whether an extracted graphical element or feature matches the candidate graphical element or feature using computer vision processing or other known graphical feature matching algorithms and/or cognitive machine learning techniques.

In block 506, application 105 determines whether the first extracted UI element feature matches a candidate UI element within a predetermined threshold range or value.

If application 105 determines that the first extracted UI element does not match a candidate UI element in the repository within the predetermined threshold range or value, process 500 continues to block 510. In block 510, application 105 provides an indication that no match has been found for the first extracted UI element and process 500 continues ends.

If application 105 determines that the first extracted UI element matches a candidate graphical feature in the repository within the predetermined threshold range or value, process 500 continues to block 512. In block 512, application 105 retrieves the encapsulated source code and code dependencies associated with the matching candidate UI element and process 500 continues to block 514. In block 514, application 105 outputs the encapsulated source code and the code dependencies and process 500 ends. In a particular embodiment, application 105 outputs the encapsulated source code and the code dependencies as source code module. In one or more embodiments blocks 506-514 are repeated for each extracted UI element of the UI design document.

Thus, a computer implemented method, system or apparatus, and computer program product are provided in the illustrative embodiments for user interface code re-use based upon machine learning of design documents and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a first design document and a second design document, the first design document specifying a graphical layout of a first set of user interface elements of a user interface of a first application and the second design document specifying a graphical layout of a second set of user interface elements of a user interface of a second application;
   receiving a first source code associated with the first design document, the first source code configured to implement the first set of user interface elements of the user interface;
   extracting, by a processor, the first set of user interface elements from the first design document;
   identifying a first portion of the first source code corresponding to a first user interface element of the first set of user interface elements;
   encapsulating the first portion of the first source code into a module to enable re-use of the portion of the source code in the second application;
   matching a second extracted user interface element, extracted from the second design document, to the first extracted user interface element; and
   outputting the encapsulated first portion of the first source code for re-use by the second application.

2. The computer-implemented method of claim 1, further comprising:
   determining one or more code dependencies for the first identified portion of the first source code, the one or more code dependencies including resources required by the first identified portion.

3. The computer-implemented method of claim 2, further comprising:
   encapsulating the one or more code dependencies in the module.

4. The computer-implemented method of claim 1, further comprising:
   storing the encapsulated portion of the first source code in association with the first user interface element.

5. The computer-implemented method of claim 4, wherein matching the second extracted user interface element to the first extracted user interface element include determining that the second extracted user interface element matches the first extracted user interface element within a predetermined threshold range.

6. The computer-implemented method of claim 5, wherein the matching of the second extracted user interface element to the first extracted user interface element is performed using computer vision processing.

7. The computer-implemented method of claim 4, wherein the first set of user interface elements are extracted from the first design document using cognitive machine learning.

8. The computer-implemented method of claim 7, wherein the cognitive machine learning includes at least one of natural language processing or computer vision processing.

9. The computer-implemented method of claim 4, wherein the first extracted user interface element includes a widget.

10. A computer usable program product comprising one or more computer-readable storage medium, and program instructions stored on at least one of the one or more storage medium, the stored program instructions comprising:
    program instructions to receive a first design document and a second design document, the first design document specifying a graphical layout of a first set of user interface elements of a user interface of a first application and the second design document specifying a graphical layout of a second set of user interface elements of a user interface of a second application;
    program instructions to receive a first source code associated with the first design document, the first source code configured to implement the first set of user interface elements of the user interface;

program instructions to extract the first set of user interface elements from the first design document;

program instructions to identify a first portion of the first source code corresponding to a first user interface element of the first set of user interface elements;

program instructions to encapsulate the first portion of the first source code into a module to enable re-use of the portion of the source code in the second application;

program instructions to match a second extracted user interface element, extracted from the second design document, to the first extracted user interface element; and program instructions to output the encapsulated first portion of the first source code for re-use by the second application.

11. The computer usable program product of claim 10, further comprising:

program instructions to determine one or more code dependencies for the first identified portion of the first source code, the one or more code dependencies including resources required by the first identified portion.

12. The computer usable program product of claim 11, further comprising:

program instructions to encapsulate the one or more code dependencies in the module.

13. The computer usable program product of claim 10, further comprising:

program instructions to store the encapsulated portion of the first source code in association with the first user interface element.

14. The computer usable program product of claim 10, wherein matching the second extracted user interface element to the first extracted user interface element include determining that the second extracted user interface element matches the first extracted user interface element within a predetermined threshold range.

15. The computer usable program product of claim 14, wherein the matching of the second extracted user interface element to the first extracted user interface element is performed using computer vision processing.

16. The computer usable program product of claim 10, wherein the stored program instructions are stored in a computer readable storage medium in a data processing system, and wherein the stored program instructions are transferred over a network from a remote data processing system.

17. The computer usable program product of claim 10, wherein the stored program instructions are stored in a computer readable storage medium in a server data processing system, and wherein the stored program instructions are downloaded over a network to a remote data processing system for use in a computer readable storage medium associated with the remote data processing system.

18. A computer system comprising one or more processors, one or more computer-readable memories, and one or more computer-readable storage medium, and program instructions stored on at least one of the one or more storage medium for execution by at least one of the one or more processors via at least one of the one or more memories, the stored program instructions comprising:

program instructions to receive a first design document and a second design document, the first design document specifying a graphical layout of a first set of user interface elements of a user interface of a first application and the second design document specifying a graphical layout of a second set of user interface elements of a user interface of a second application;

program instructions to receive a first source code associated with the first design document, the first source code configured to implement the first set of user interface elements of the user interface;

program instructions to extract the first set of user interface elements from the first design document;

program instructions to identify a first portion of the first source code corresponding to a first user interface element of the first set of user interface elements;

program instructions to encapsulate the first portion of the first source code into a module to enable re-use of the portion of the source code in the second application;

program instructions to match a second extracted user interface element, extracted from the second design document, to the first extracted user interface element; and program instructions to output the encapsulated first portion of the first source code for re-use by the second application.

* * * * *